(12) United States Patent
Imbimbo et al.

(10) Patent No.: US 8,265,077 B2
(45) Date of Patent: Sep. 11, 2012

(54) LAWFUL INTERCEPTION METHOD AND ARCHITECTURE FOR TRANSPARENT TRANSMISSION OF INTERCEPTION INFORMATION

(75) Inventors: Amedeo Imbimbo, Caivano (IT); Enrico De Luca, Caserta (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1287 days.

(21) Appl. No.: 11/915,404

(22) PCT Filed: May 31, 2005

(86) PCT No.: PCT/EP2005/052488
§ 371 (c)(1),
(2), (4) Date: Jan. 4, 2008

(87) PCT Pub. No.: WO2006/128495
PCT Pub. Date: Dec. 7, 2006

(65) Prior Publication Data
US 2008/0198993 A1    Aug. 21, 2008

(51) Int. Cl.
H04L 12/56 (2006.01)
H04M 1/64 (2006.01)
H04M 3/42 (2006.01)
G06F 9/44 (2006.01)

(52) U.S. Cl. ..... 370/392; 370/389; 379/70; 379/213.01; 709/224

(58) Field of Classification Search .......... 370/352–356, 370/389, 390, 392, 522, 401, 235, 252; 379/213.01, 379/211.01, 211.02, 67.1–70; 455/414.1; 713/164, 200; 709/204–206, 223–224
See application file for complete search history.

(56) References Cited

U.S. PATENT DOCUMENTS

| | | | |
|---|---|---|---|
| 6,711,689 B2* | 3/2004 | Lumme et al. | 726/22 |
| 7,231,218 B2* | 6/2007 | Diacakis et al. | 455/456.1 |
| 7,283,521 B1* | 10/2007 | Ryan | 370/389 |
| 2002/0150096 A1* | 10/2002 | Sjoblom | 370/389 |
| 2003/0179747 A1* | 9/2003 | Pyke et al. | 370/389 |
| 2003/0219103 A1* | 11/2003 | Rao et al. | 379/32.05 |
| 2004/0095894 A1* | 5/2004 | Eloranta et al. | 370/252 |
| 2004/0165709 A1* | 8/2004 | Pence et al. | 379/201.01 |
| 2004/0246907 A1* | 12/2004 | Hoffmann | 370/252 |
| 2005/0174937 A1* | 8/2005 | Scoggins et al. | 370/230 |
| 2007/0287428 A1* | 12/2007 | Diacakis et al. | 455/414.1 |

* cited by examiner

Primary Examiner — Asad Nawaz
Assistant Examiner — Wutchung Chu

(57) ABSTRACT

A system, method, and gateway in a telecommunication network for providing intercepted Content of Communications (CC) information from an Intercepting Control Element (ICE) to a Law Enforcement Monitoring Facility (LEMF). The system splits the intercepted CC information into CC control and CC payload information. A control point receives the control information and controls the gateway in accordance with the control information. The gateway receives the payload information and routes it to the LEMF over a payload Handover Interface.

10 Claims, 6 Drawing Sheets

LAWFUL INTERCEPTION METHOD AND ARCHITECTURE FOR TRANSPARENT TRANSMISSION OF INTERCEPTION INFORMATION

FIELD OF THE INVENTION

The present invention relates to lawful interception method and architecture for transparent transmission of interception information.

BACKGROUND OF THE INVENTION

Interception of phone calls is used in modern telecommunications networks for allowing Law Enforcement Agencies (LEAs), authorised by a national law or a Court, to watch particular users who exchange potentially illicit information over the telecommunications network.

A standard reference architecture for Lawful Interception (LI) is provided in ETSI specification ES 201 671 v.2.1.1 and is depicted in FIG. 1.

The standard architecture 10 comprises an Intercepting Control Element (ICE) 11 providing the user equipment of the target user with an access to the telecommunications network. An ICE may be, for instance, a 3G Mobile service Switching Centre (USC) Server, a 3G Gateway MSC Server, a Serving GPRS Support Node (SGSN), or a Gateway GSN.

The architecture 10 further comprises one or more Law Enforcement Monitoring Facilities (LEMFs) 12 through which respective LEAs receive interception information.

An Administration Function (ADMF) entity 13 is further provided for sending the target identity and LI authorisation data from the LEAs to the ICE. The ADMF interfaces with all the LEAs that may require interception in the intercepting network, keeps the intercept activities of individual LEAs separate and interfaces to the intercepting network. The ADMF 13 is also used to hide from the ICE 11 that there might be multiple activations by different LEAs on the same target.

Every physical ICE 11 is linked to the ADMF by means of its own X1_1 interface. Consequently, every single ICE performs interception, i.e. activation, deactivation, interrogation as well as invocation, independently from other ICEs.

In order to deliver the intercepted information to the LEAs, two Delivery Function (DF) entities are provided, each exchanging respective portions of information with the ADMF 13 (through X1_2 and X1_3 interfaces) and the LEMF 12.

In particular, a DF2 entity 14 receives Intercept Related Information (IRI) from the ICE, through an X2 interface, and converts and distributes the IRI to the relevant LEAs via a Handover Interface 2 HI2 by means of a Mediation Function (MF) 15. The Handover Interfaces are described in detail, for example, in the specification 3GPP TS 33.108, release 6, which is herein incorporated by reference.

The IRI is a collection of information or data associated with telecommunication services involving the target identity, such as call associated information or data (e.g. unsuccessful call attempts), service associated information or data (e.g. service profile management by subscriber) and location information.

A DF3 entity 16, instead, receives Content of Communications (CC) information from the ICE through an X3 interface, and converts and distributes such information to the relevant LEA through an MF 17 and an HI3 interface.

The CC is information, different from the IRI, which is exchanged between two or more users of a telecommunications service and, more in general, includes information which may, as part of some telecommunications service, be stored by one user for subsequent retrieval by another user.

With reference to Circuit Switched (CS) calls, interception of calls between an intercepted subscriber 23 and a calling/called party 24 is accomplished through the schematic access arrangement depicted in FIG. 2, which is described in 3GPP TS 33.107 v6.1.0. In particular, the signals of both parties 23 and 24 are separately delivered to the LEMF 22 through a T connection at a Media Gateway 21 and a DF3 26.

For the delivery of the CC and IRI, the 3G MSC Server provides a target identity and a correlation number to the DF2 and DF3 which is used in order to select the different LEAs to which the LI product shall be delivered. The target identity typically comprises one of an International Mobile Subscriber Identity (IMSI), a Mobile Subscriber ISDN Number (MSISDN) and an International Mobile Equipment Identity (IMEI). If interception has been activated for both parties of the call both CC and IRI will be delivered for each party as separate intercept activity.

The access method for delivering Packet Data GSN Intercept Product is accomplished through the schematic arrangement depicted in FIG. 3. The method is based on duplication of packets.

A duplicator of packets 35 is provided at the 3G GSN 31 for duplicating packets intercepted between the target subscriber 33 and the other party 34.

The duplicated packets are then sent to the DF3 36 for further delivery to LEA 32 through a tunnel. The DF3 extracts and interprets a header for each duplicated packet from the X3 interface so as to allow the DF3 36 to perform its functionality.

In the current DF3 architecture, X3 and HI3 interfaces are not suitable for high CC inflows deriving from interception of high bandwidth-consuming services like, for instance, IP-TV or broadcasting, which may be as high as Gbits of information per second.

According to the above LI standards, for each single intercepted packet received on X3, a dedicated LI header is to be extracted and interpreted by the DF3 in order to mediate, direct and possibly multiply the packet towards all interested LEAs via the HI3. Similarly, the same packet needs to be re-built on the HI3 before being sent to the LEA.

SUMMARY OF THE INVENTION

The aim of the present invention is to overcome the above drawbacks by introducing a new architecture and method that is able to bear high traffic rate exchanges of intercepted information.

Within the above aim, a particular object of the invention is to allow routing of CC payload information in a transparent manner towards different addresses.

Another object of the invention is to allow authorities to have the speech call content interception information in an analog format, in particular over E1/STM connections, regardless of how such information is internally transported within the Public Land Mobile Network (PLMN).

Yet another object of the invention is to allow easy manipulation of CC payload information and to improve DF3 flexibility in terms of connection bandwidth allocated per ICE type or traffic type.

The above aim and other objects which will become apparent hereinafter are achieved by a method for providing intercepted Content of Communications CC information from Intercepting Control Element ICE to at least one Law Enforcement Monitoring Facility LEMF through Delivery Functions in a telecommunications network, comprising the steps of:

splitting the intercepted CC information into CC control information and CC payload information;

at a Lawful Interception Content of Communications Control Point LI CC CP, receiving the CC control information and processing the CC control information;

at an LI CC Gateway, receiving the CC payload information from the ICE over a payload interface X3, the LI CC Gateway being controlled by the LI CC CP according to the CC control information; and at the LI CC Gateway, switching the CC payload information to the at least one LEMF over a payload Handover Interface 3 HI3.

The above aim and objects are also achieved by an architecture for providing intercepted Content of Communications CC from an Intercepting Control Element ICE to at least one Law Enforcement Monitoring Facility LEMF, comprising at least one Delivery Function in a telecommunications network and comprising means for splitting the intercepted CC information into CC control information and CC payload information; a Lawful Interception Content of Communications Control Point LI CC CP, for receiving the CC control information and processing the CC control information; an LI CC Gateway connected to the LI CC CP, the LI CC Gateway being further connected to the ICE through a payload interface X3 for receiving the CC payload information, and being connected to the at least one LEMF through a payload Handover Interface 3 HI3, the LI CC Gateway comprising means for switching the CC payload information to the at least one LEMF based on instructions from the LI CC CP.

Advantageously, the LI CC Gateway is a Media Gateway MGW, the LI CC CP controlling the LI CC Gateway according to the H.248 protocol, the Media Gateway Control MEGACO protocol or a proprietary protocol.

Preferably, according to a first embodiment of the invention, the step of receiving the CC control information comprises the steps of providing the LI CC CP with a Control Delivery Function 3 DF3 and a Control Mediation Function for sending CC control information to the LEMF over a signalling control HI3, the CC control information being received from the ICE over an X3 signalling control interface.

The LI CC CP may receive the CC control information from the ICE either directly or through the LI CC Gateway, which receives the X3 control signalling and then switches the received information to the LI CC CP 46 through a signalling gateway function.

According to a second embodiment, the LI CC CP is implemented in an entity comprising a Delivery Function 2 DF2 for distributing Intercept Related Information IRI to LEMFs via a Handover Interface 2 HI2, the LI CC CP controlling the LI CC Gateway by means of a standard Gateway Control Protocol GCP.

In a third embodiment of the invention, the LI CC CP and the LI CC Gateway are implemented in a same Delivery Function 3 DF3 and the CC control information is received from the ICE over an X3 signalling control interface and is sent to the at least one LEMF over a signalling control HI3.

The step of receiving the CC control information preferably includes the steps of:

receiving a Start CC Sending message from the ICE comprising a target identity and a correlation number for correlating the CC with IRI;

instructing the LI CC Gateway to perform an asymmetrical connection from the ICE to the LI CC Gateway;

checking the target identity and the correlation number and requesting the LI CC Gateway at least one outlet to be used for connection towards the at least one LEMF;

sending the Start CC Sending message to the at least one LEMF;

upon acknowledgement from the at least one LEMF, sending the payload information to the LI CC Gateway.

Should the LI CC Gateway be controlled through H.248/MEGACO protocol, the above instructing step preferably comprises sending a first add termination instruction for creating a termination between the ICE and the LI CC Gateway and creating a context at the LI CC Gateway. Moreover, in this case, the request to the LI CC Gateway for an outlet comprises sending a second add termination instruction for creating a termination between the LI CC CP and the at least one LEMF within the context.

The aim and the objects of the invention are further achieved by a gateway for providing Lawful Interception LI services in a telecommunications network, wherein the gateway comprises means for receiving Content of Communications CC payload information from an Intercepting Control Element ICE over a payload interface X3, means for switching the CC payload information to at least one Law Enforcement Monitoring Facility LEMF over a payload Handover Interface 3 HI3, and means for receiving instructions for the CC payload information from an LI CC Control Point of a Delivery Function. Preferably, such gateway is a Media Gateway and the instructions are sent to the LI CC Gateway according to one of the H.248 and the MEGACO protocol.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION OF THE PREFERRED EMBODIMENTS

Figure 1:
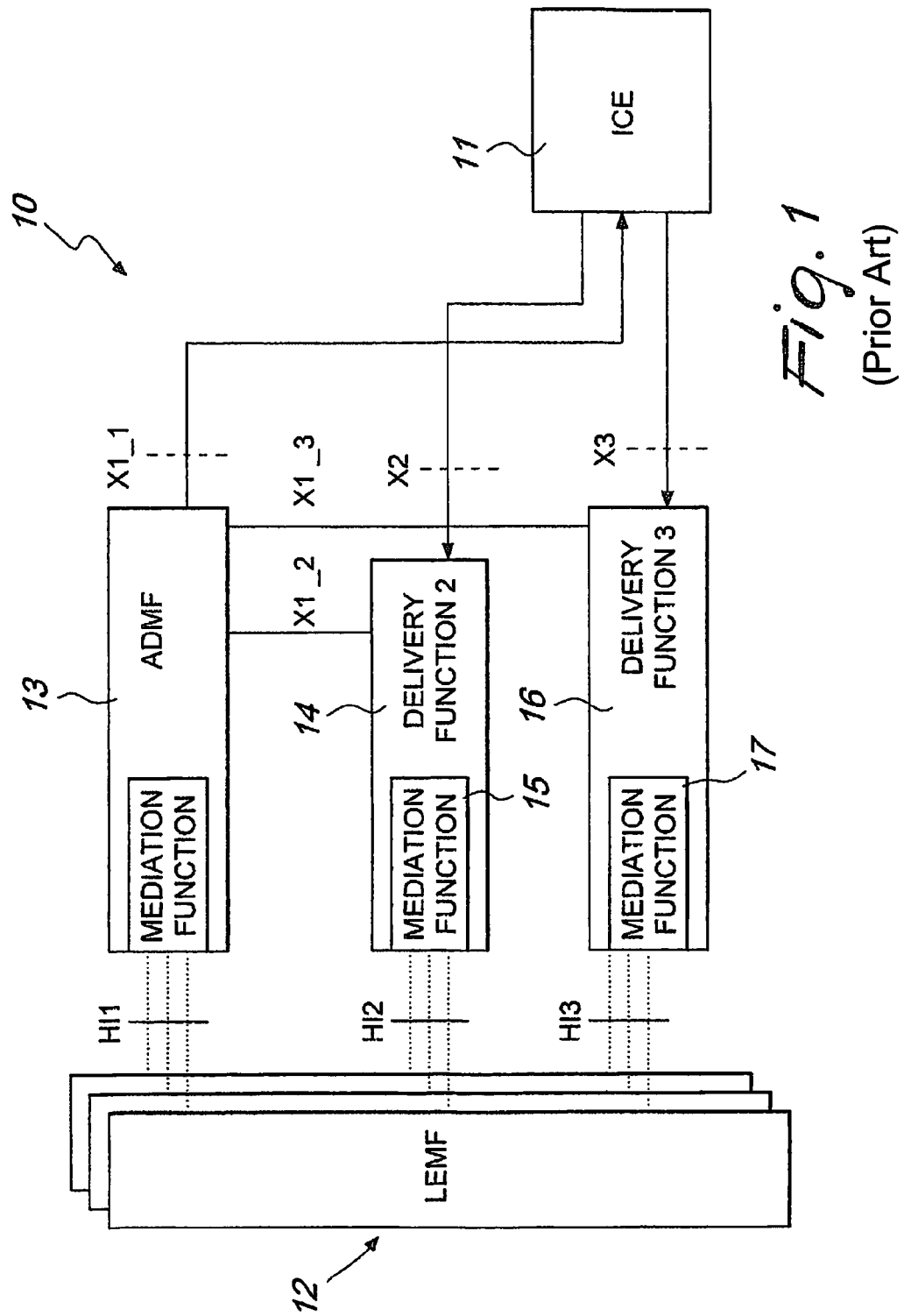
FIG. 1 is a standard reference architecture for Lawful Interception.
Figure 2:
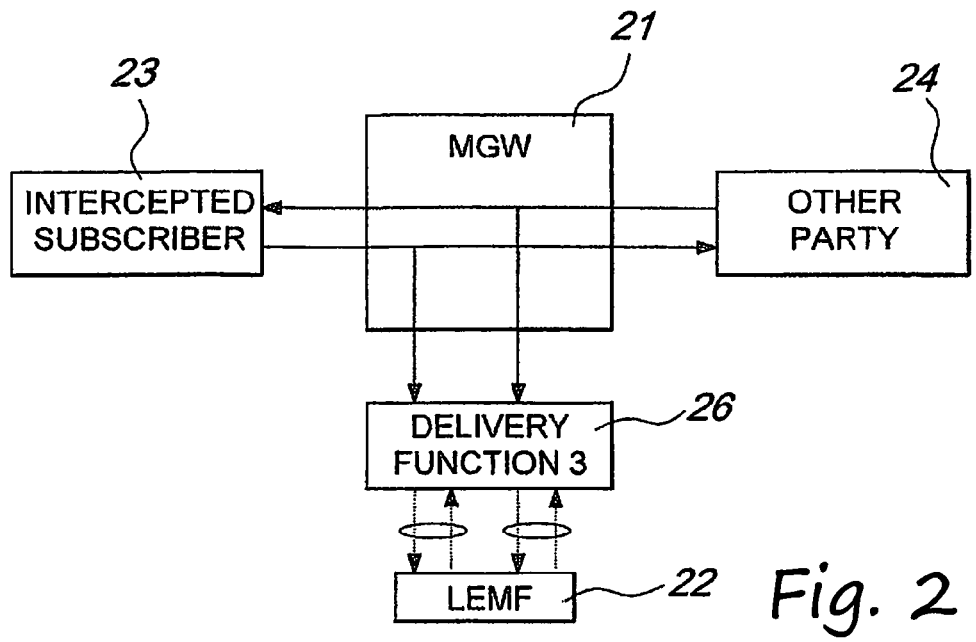
FIG. 2 is a schematic access arrangement for CS calls.
Figure 3:
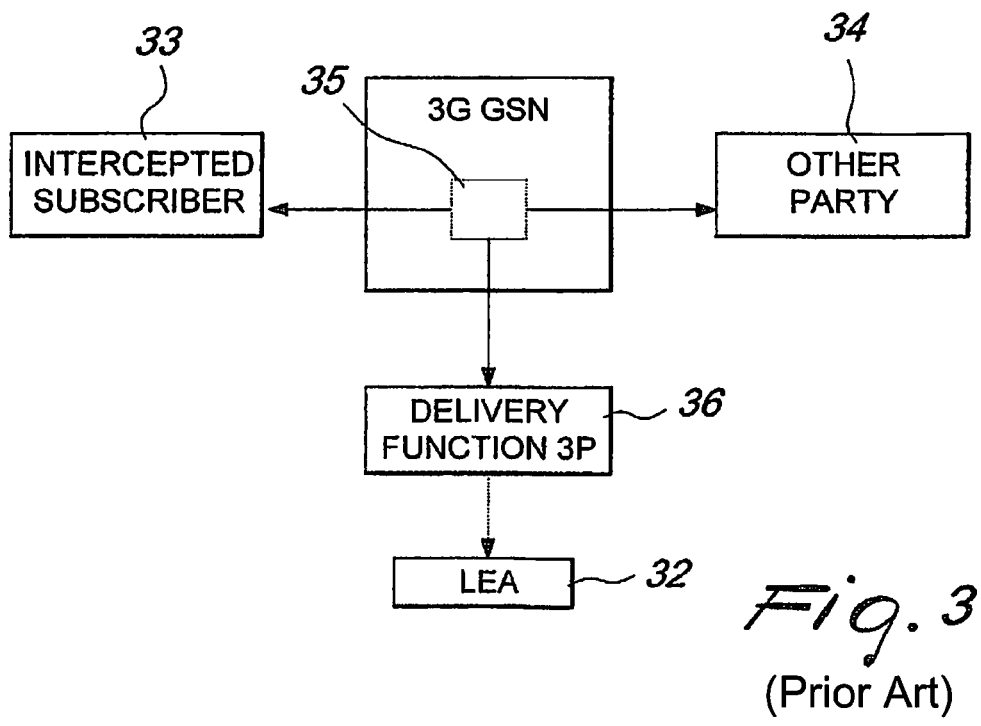
FIG. 3 is a schematic access arrangement for Packet data GSN services.
Figure 4:
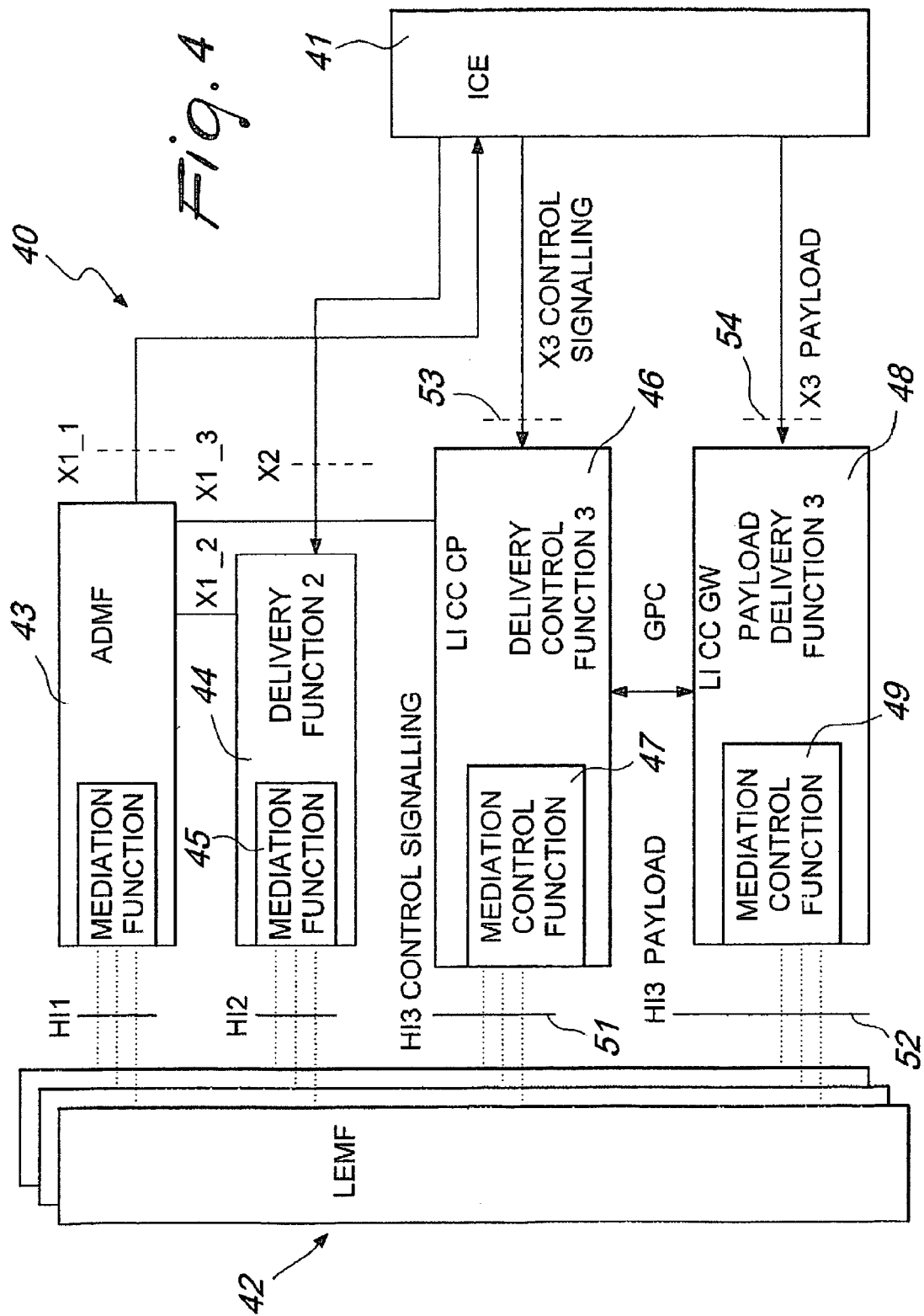
FIG. 4 is an LI architecture according to a first embodiment of the invention.

With reference to FIG. 4, the architecture 40 according to a first embodiment of the invention comprises an ICE 41, one or more LEMFs 42 and an ADMF 43. The ADMF 43 is connected to the LEMFs through respective HI1 interfaces and through a Mediation Function (MF), and exchanges information with the ICE 41 via an X1_1 interface.

A DF2 44 is provided for interpreting IRI information received from the ICE 41 through X2 interface and distributing the same to the requesting LEAs via an MF 45 and an HI2. The DF2 44 communicates with the ADMF 43 through an X1_2 interface.

The architecture 40 is characterised in that the CC information is split into CC control information and CC payload information. To this aim, differently from the known arrangements, the DF3/MF3 function is preferably split into two separate DF3/MF3 entities, namely an LI CC Control Point (LI CC CP) 46 and an LI CC Gateway 48.

The LI CC Gateway 48 is a general purpose gateway for switching only CC payload information (PS packets or CS bearers) to the interested LEMF(s) and leaving such payload information unchanged.

All DF3-related LI functionality is concentrated in the LI CC CP 46, which includes its own Control DF3 and a Control MF3 47 and communicates with the ICE and the LEMFs through X3 and HI3 control signalling, respectively.

The LI CC CP 46 is set so as to control the gateway 48 through a standard Gateway Control Protocol (GCP). Preferably, the gateway 48 behaves as a Media Gateway (MG) and the GCP is the H.248 protocol or the Megaco (Media Gateway Control) protocol.

The specification of Megaco/H.248 protocol is set forth in ITU-T H.248.1 "Gateway Control Protocol: version 2", which is hereby incorporated by reference.

The Megaco/H.248 protocol is particularly used for controlling elements of a physically decomposed multimedia gateway, which enables separation of call control from media conversion. The Megaco/H.248 addresses the relationship between the Media Gateway (MG), which converts, for instance, circuit-switched voice to packet-based traffic, and the Media Gateway Controller (MGC or "call agent" or "softswitch"), which dictates the service logic for the above traffic.

According to the Megaco/H.248 protocol, the MG is instructed to connect streams coming from outside a packet or cell data network onto a packet or cell data stream such as the Real-Time Transport Protocol (RTP).

Although it is similar to MGCP, the Megaco/H.248 protocol supports a broader range of networks, such as the ATM networks.

Streams entering or leaving the MG are called terminations, which have properties that can be inspected and modified by the MGC. A termination may have more than one stream.

Terminations are placed into contexts, which are defined as when two or more termination streams are mixed and connected together. Contexts are created and released by the MG under command of the MGC. A context is created by adding the first termination and it is released by subtracting (i.e. removing) the last termination.

Returning to the first preferred embodiment of the invention, the LI CC CP 46 receives CC control information from the ICE 41 via an X3 control signalling interface 53. The X3 control signalling is a protocol that is used to indicate when the ICE 41 starts/stops sending intercepted CC of a certain target. The X3 control signalling comprises two messages in the direction from the ICE 41, namely a Start CC Sending message and a Stop CC Sending message.

Two corresponding Acknowledge messages in the direction towards the ICE 41 are also provided, in order to prevent the ICE from sending information before having received a confirmation from the LEMF 42 or the LI CC Gateway 48. If a failure occurs in establishing connections in the LI CC Gateway 48, a reject message is sent to the ICE 41.

The Start CC Sending message preferably contains at least a target identity and a correlation number. In addition, the Start CC Sending message may contain the target location (if available) or the Interception Areas in case of location dependent interception, and other information needed for call interception such as, for instance, an indication of mono or stereo delivery.

Instead, the Stop CC Sending message preferably contains the target identity information.

The X3 control signalling of FIG. 4 is carried out on a separate link 53 from the ICE 41 towards the LI CC CP 46. This arrangement is, however, only an illustrative one and different alternative implementations can be provided. For instance, the X3 control signalling may be sent towards the LI CC Gateway 48 and then switched to the LI CC CP 46 through a signalling gateway function, so that the LI CC CP 46 indirectly receives the CC Control Information from the ICE.

The HI3 control signalling is used to inform the LEMF when the ICE 41 starts/stops sending intercepted CC of a certain target. The protocol for HI3 control signalling mainly contains two messages in the direction to the LEMFs 52, namely the Start and a Stop CC Sending messages containing the same information elements of the X3 control signalling. The Start CC Sending message may optionally comprise the Lawful Interception Identifier (LIID).

In the direction from the LEMFs 42, two Acknowledge messages corresponding to the foregoing Start/Stop CC sending are provided in the HI3 control signalling, in order to prevent the LI CC CP from sending information to the LEMFs 42.

It is noted that the above control signalling carries a subset of the information that is currently used in ULIC (UMTS LI Correlation) headers of Packet Switched (PS) interception. The remaining part is added to the intercepted payload, as explained hereinafter.

Even though the HI3 control signalling is carried out from the LI CC CP 46 on a separate link 51 towards the LEMFs 42, the HI3 control signalling may be alternatively sent towards the LI CC Gateway 48 and then switched to the LEMFs 42 through a signalling gateway function.

Although the HI3 or the X3 control signalling may be switched through a signalling gateway at the LI CC Gateway, the control signalling remains a logically separated controlling signalling link.

The LI CC Gateway 48 comprises an X3 payload interface through which the ICE 41 sends a duplication of packets (or the bearer as currently implemented for MGWs) and an HI3 payload interface.

The call content sent on the X3 payload interface preferably comprises a time stamp, the correlation number and the direction (uplink/downlink) as information elements. This information is substantially a subset of the information carried by the ULIC header which is not contained in the X3 control interface.

The HI3 payload interface is used for transferring the packets received on the X3 payload interface to the LEMFs 42, which packets are left unchanged by the LI CC Gateway 48.

A parameter identifying the timeslots to be used for payload transmission is used in the above interfaces, which is equivalent to the Call Instance Code (CIC) used in the Bearer Independent Call Control (BICC) in mobile and NGN network architectures.

Figure 5:
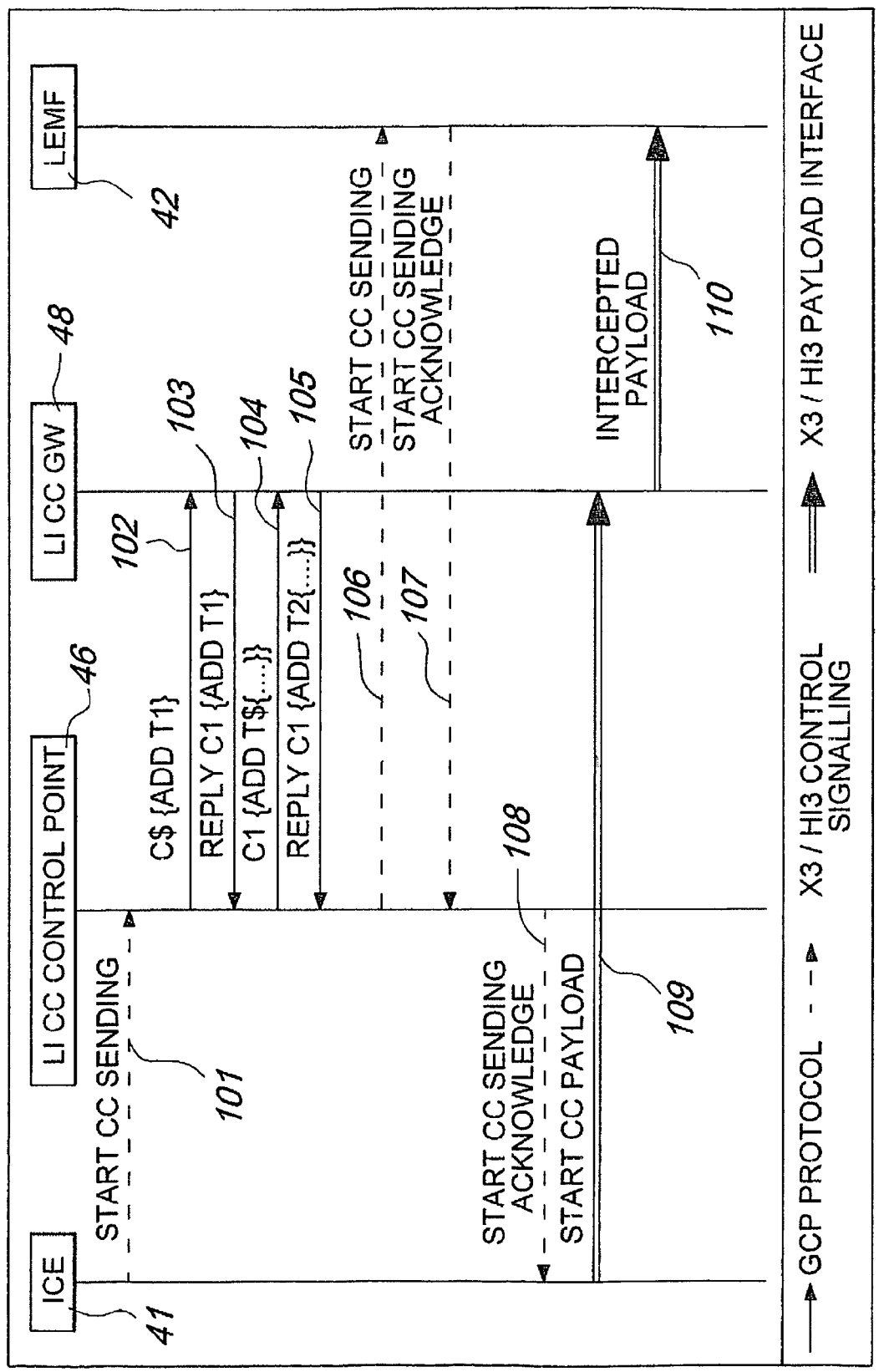
FIG. 5 is a diagram of the interception starting method according to the preferred embodiments of the invention.
Figure 6:
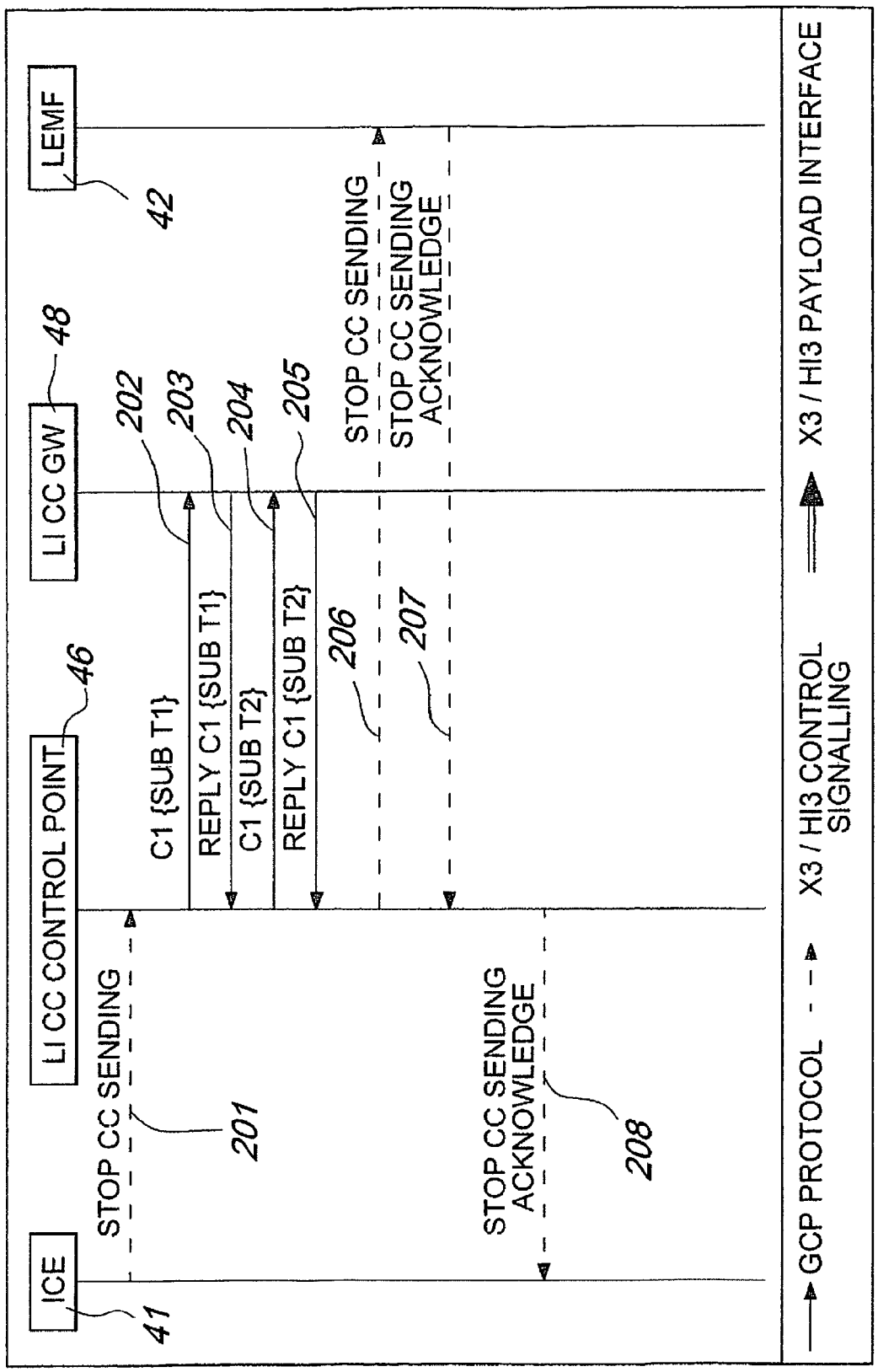
FIG. 6 is a diagram of the interception stopping method according to the preferred embodiments of the invention.

Taking into account the definitions of the various interfaces between the ICE, the LEMFs and the DF3 entities, the steps schematically indicated in FIG. 5 are preferably carried out.

Upon reception of the Start CC Sending message from the ICE 41 (step 101) over the X3 control signalling interface, the LI CC CP 46 orders the LI CC Gateway 48 to perform an asymmetrical connection in the direction from the ICE 41 to the LI CC Gateway 48 (step 102). The instruction from the LI CC CP is preferably provided according to the H.248 protocol as an "Add termination" command "C$ {Add T1}" where T1 is the termination from the ICE to the LI CC Gateway 48. A context is accordingly created at the LI CC Gateway 48, which is herein referred to as C1, and a reply message "Reply C1{Add T1}" is sent to the LI CC CP (step 103).

The LI CC CP 46 checks the received target identity and retrieves which LEMF(s) activated the CC interception for that target. Assuming that only one LEMF is interested to receive the CC, the LI CC CP requests the LI CC Gateway 48 for an outlet towards the specified LEMF 42 (step 104). The request is an Add termination command (indicated as "C1{Add T${ . . . }}" in FIG. 5) for creating a new termination from the LI CC CP 46 to the LEMF 42 in the context C1.

After having received the acknowledge message from the LI CC Gateway 48 (step 105) in which the termination is identified as T2, the LI CC CP 46 sends the Start CC Sending message towards the LEMF 42 (step 106) via the HI3 control signalling interface.

Then, upon receiving the corresponding acknowledge message from the LEMF (step 107), the LI CC CP 46 sends the Start CC Sending acknowledge message to the ICE 41 via the X3 control signalling (step 108).

As a consequence thereof, the ICE 41 sends the payload to the LI CC Gateway 48 via the X3 payload interface (step 109). Finally, the LI CC Gateway 48 switches such payload towards the LEMF via the HI3 payload interface (step 110). The payload is simply forwarded, i.e. it is left unchanged.

Preferably, when the payload has to be sent to more than one LEMF, the LI CC CP orders the LI CC Gateway to seize an outlet for each LEMF and a conference device is used to switch the payload coming from the ICE towards the destination LEMFs.

As the payload transfer has been completed, the ICE sends a Stop CC Sending message to the LI CC CP 46 (step 201). Accordingly, the LI CC CP sends a first Subtract command to the LI CC Gateway 48 for disconnecting the termination T1 (step 202) and, upon reception of the corresponding reply from the gateway (step 203), sends a second Subtract command (step 204) to disconnect the termination T2 and receives a corresponding Reply command from the gateway (step 205). Because of disconnection of the last termination T2, the context C1 is released.

Then, the LI CC CP 46 sends the Stop CC Sending message towards the LEMF 42 via the HI3 control signalling interface (step 206) and, after having received the corresponding Acknowledge message from the LEMF via the HI3 (step 207), sends the Stop CC Sending Acknowledge message to the ICE 41 on the X3 control signalling interface (step 208).

Preferably, for interceptions in the Wireline Local Exchange and in the MSC, the transmission media used to support the HI3 port 54 is preferably the media currently used for standard ISDN calls, based on 64 kbit/s circuit switched bearer connections.

For circuit switched calls, without changing the operation of the MSC, the LI CC CP receives an ISUP call from the MSC and the LI CC Gateway receives the packets from the Media Gateway. Then, the LI CC CP starts an ISUP call towards the monitoring centre and the LI CC Gateway finally sends the packets.

Therefore, the method, the architecture ant the LI CC Gateway according to the invention fully comply and fit with the current standardised architectures for CS and fixed call interception.

Figure 7:
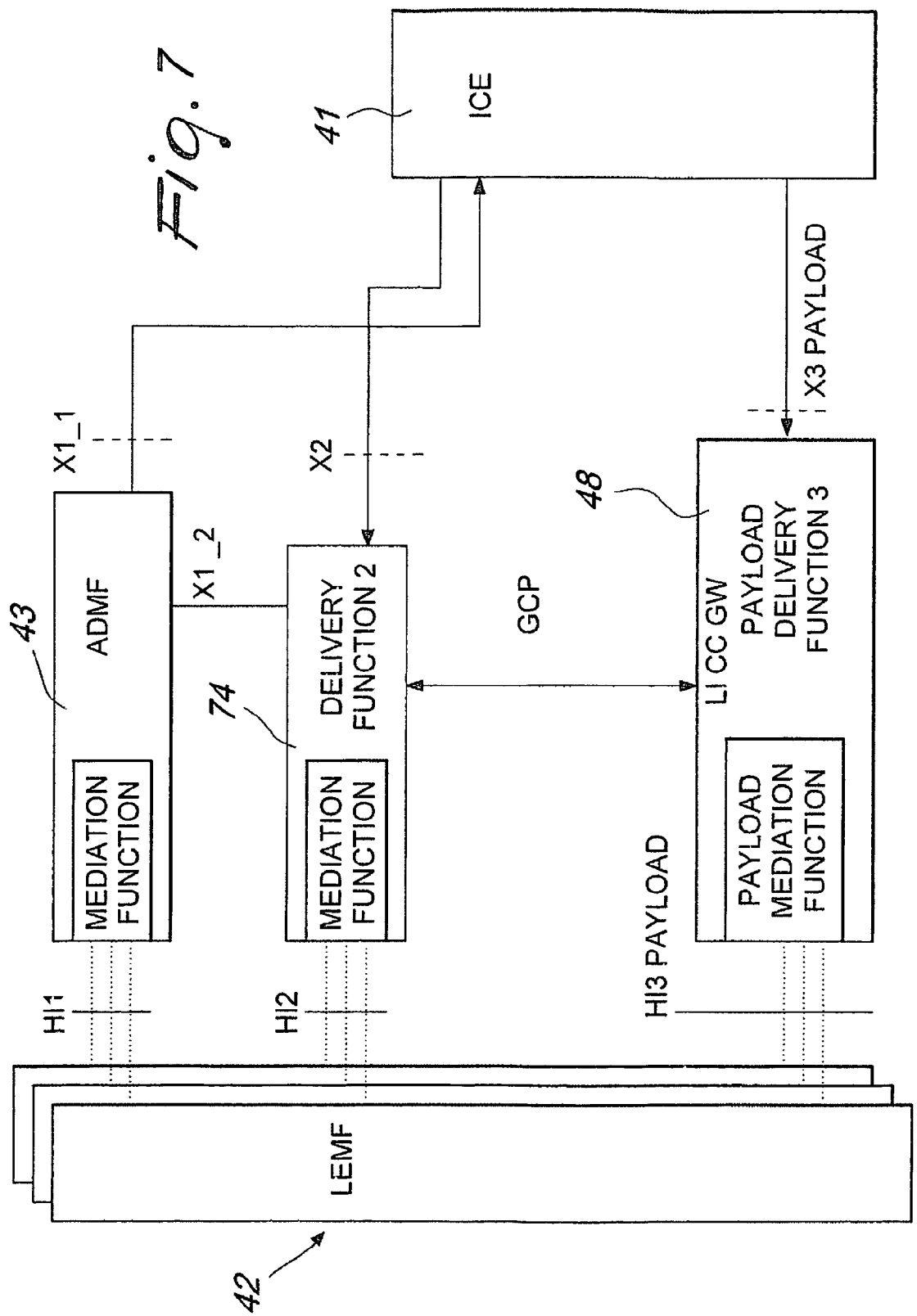
FIG. 7 is an LI architecture according to a second embodiment of the invention.

It is straightforward to understand that the method according to the invention may be implemented by means of architectures different from the architecture shown in FIG. 4, sharing the same concept of providing a DF3 gateway that transports only payload data and forwards such data to the LEMFs. For instance, according to a second embodiment of the invention, the LI CC CP is included into a DF2 entity 74 (FIG. 7).

In this case, it is the DF2 that controls the LI CC Gateway 48 by means of a GCP protocol, such as the H.248. The LI CC Gateway 48 receives and forwards payload through the X3 and HI3 payload interfaces defined above.

In order to provide an indication of the CC interception start/stop from the ICE 41, the first and last IRI messages on the X2 interface are used. Similarly, the indication of the CC interception start/stop towards the LEMFs 42 is obtained from the first and last IRI messages on the HI2 interface.

The HI2 and X2 interfaces are accordingly modified so as to provide an acknowledgement to the first and last IRI messages that indicates that the CC can be sent and a rejection indicating a failure in the connection establishment in the LI CC Gateway 48.

According to a third embodiment of the invention, not shown in the Figures, the LI CC CP and the LI CC Gateway are merged into a single DF3 entity. The CC information is still split into CC control information and CC payload information and is exchanged through distinct X3/HI3 control signalling and X3/HI3 payload interfaces as in the above embodiments.

The resulting "monolithic" DF3 comprises a general purpose gateway, which transports the payload without processing it towards the relevant LEMFs, and a control layer functionality that handles X3/HI3 control signalling and the control of the LI CC Gateway through an internal or proprietary interface which preferably does not use a GCP protocol.

Therefore, in the third embodiment of the invention the LI can be implemented using less featured routers, i.e. which do not support GCP protocol.

It has thus been shown that the present invention fulfils the proposed aim and objects. A new architecture is provided for the current standardised cases where an LI specific header is added to every CC intercepted packet. In particular, since the DF3 is not burdened with the task of processing each single CC intercepted packet having its own LI header so as to forward the packet to the relevant LEMFs, it is possible to greatly improve the flexibility of lawful interception in terms of connection bandwidth allocated per ICE type or traffic type.

The X3/HI3 interfaces from and to ICEs and LEMFs are advantageously split into X3/HI3 control signalling and X3/HI3 payload interfaces.

A general purpose gateway is then provided for LI CC payload distribution only, without adding any LI specific functionality and concentrating all DF3-related LI functionality in an LI CC Control Point.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method in a telecommunications network for providing intercepted Content of Communications (CC) information from an Intercepting Control Element (ICE) to at least one Law Enforcement Monitoring Facility (LEMF), said method comprising the steps of:

at the ICE, splitting the intercepted CC information into CC control information and CC payload information, sending the CC control information to a control point, and sending the CC payload information to a gateway;

at the control point, processing the CC control information to obtain instructions for controlling the gateway, wherein the processing step includes:

receiving a Start CC Sending message from the ICE, said Start CC Sending message including a target identity and a correlation number for correlating the CC information with Intercept Related Information (IRI);

instructing the gateway to perform an asymmetrical connection from the ICE to the gateway;

sending the Start CC Sending message to the at least one LEMF;

receiving an acknowledgment from the at least one LEMF; and forwarding the acknowledgment to the ICE, thereby prompting the ICE to begin sending the CC payload information to the gateway; and at the gateway, routing the CC payload information to the at least one LEMF based on the instructions from the control point.

2. The method as recited in claim 1, wherein the gateway is a Media Gateway (MGW), and the control point controls the gateway according to any one of the H.248 protocol and the Media Gateway Control (MEGACO) protocol.

3. The method as recited in claim 1, wherein the step of instructing the gateway to perform an asymmetrical connection from the ICE to the gateway includes:

sending a first add termination instruction to the gateway for creating a termination between the ICE and the gateway and for creating a context at the gateway; and requesting an outlet to be utilized for connection toward the at least one LEMF by sending a second add termination instruction for creating a termination between the control point and the at least one LEMF within the context.

4. A system in a telecommunications network for providing intercepted Content of Communications (CC) from an Intercepting Control Element (ICE) to at least one Law Enforcement Monitoring Facility (LEMF), said system comprising:

means within the ICE for splitting the intercepted CC information into CC control information and CC payload information;

a control point for receiving the CC control information and processing the CC control information to obtain instructions for controlling a gateway, wherein the control point includes:

means for receiving a Start CC Sending message from the ICE, said Start CC Sending message including a target identity and a correlation number for correlating the CC information with Intercept Related Information (IRI);

means for instructing the gateway to perform an asymmetrical connection from the ICE to the gateway;

means for sending the Start CC Sending message to the at least one LEMF;

means for receiving an acknowledgment from the at least one LEMF; and means for forwarding the acknowledgment to the ICE, thereby prompting the ICE to begin sending the CC payload information to the gateway; and the gateway connected to the control point, the ICE, and the at least one LEMF, said gateway being connected to the ICE through a payload interface for receiving the CC payload information, and being connected to the at least one LEMF through a payload Handover Interface, the gateway including means for switching the CC payload information to the at least one LEMF based on the instructions from the control point.

5. The system as recited in claim 4, wherein the gateway is a Media Gateway (MGW), and the instructions are based on any one of the H.248 protocol and the Media Gateway Control (MEGACO) protocol.

6. The system as recited in claim 4, wherein the control point includes a Control Delivery Unit and a Control Mediation Unit for sending the CC control information to the at least one LEMF over a signaling control path, the CC control information being received from the ICE over a signaling control interface.

7. The system as recited in claim 4, wherein the means within the gateway for switching the CC payload information to the at least one LEMF includes:

means for receiving the CC control information from the ICE over a control signaling interface; and means for switching the CC control information to the control point through a signaling gateway unit.

8. The system as recited in claim 4, wherein the control point and the gateway are implemented in a single node, said node being further connected to the ICE through a first signaling control interface for receiving the CC control information at the control point, and being further connected to the at least one LEMF through a second signaling control interface for sending the CC control information to the at least one LEMF.

9. The system as recited in claim 4, wherein the control point is implemented in a delivery node for distributing Intercept Related Information (IRI) to LEMFs via a Handover Interface, said control point controlling the gateway utilizing a Gateway Control Protocol (GCP).

10. The system as recited in claim 4, wherein the instructions for the gateway include:

a first add termination instruction for creating a termination between the ICE and the gateway and for creating a context at the gateway; and an outlet instruction requesting the gateway to utilize an outlet for connection toward the at least one LEMF, said outlet instruction including a second add termination instruction for creating a termination between the control point and the at least one LEMF within the context.

* * * * *

UNITED STATES PATENT AND TRADEMARK OFFICE
CERTIFICATE OF CORRECTION

| | | |
|---|---|---|
| PATENT NO. | : 8,265,077 B2 | Page 1 of 1 |
| APPLICATION NO. | : 11/915404 | |
| DATED | : September 11, 2012 | |
| INVENTOR(S) | : Imbimbo et al. | |

It is certified that error appears in the above-identified patent and that said Letters Patent is hereby corrected as shown below:

In Column 1, Line 26, delete "(USC)" and insert -- (MSC) --, therefor.

Signed and Sealed this
Twenty-seventh Day of November, 2012

David J. Kappos
*Director of the United States Patent and Trademark Office*